US011055747B2

(12) United States Patent
Littlejohn et al.

(10) Patent No.: US 11,055,747 B2
(45) Date of Patent: *Jul. 6, 2021

(54) SPLIT SPOT BREAKS

(71) Applicant: iHeartMedia Management Services, Inc., San Antonio, TX (US)

(72) Inventors: Jeffrey Lee Littlejohn, Mason, OH (US); Jeffrey James Bengel, Springboro, OH (US); David C. Jellison, Jr., Ogallala, NE (US); Daniel N. MacTiernan, Ocean City, NJ (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,974

(22) Filed: Jul. 2, 2019

(65) Prior Publication Data
US 2019/0325484 A1 Oct. 24, 2019

Related U.S. Application Data

(63) Continuation of application No. 14/076,420, filed on Nov. 11, 2013, now Pat. No. 10,346,884.

(51) Int. Cl.
*G06Q 30/02* (2012.01)

(52) U.S. Cl.
CPC ......... *G06Q 30/0272* (2013.01); *G06Q 30/02* (2013.01)

(58) Field of Classification Search
USPC ................................................ 705/14, 14.49
See application file for complete search history.

(56) References Cited

U.S. PATENT DOCUMENTS

| 5,778,187 A | 7/1998 | Monteiro et al. |
| 5,822,735 A | 10/1998 | De Lapa et al. |
| 5,983,005 A | 11/1999 | Monteiro et al. |

(Continued)

OTHER PUBLICATIONS

Marketing Spot Optimization (Year: 2013).*

(Continued)

*Primary Examiner* — Gautam Ubale
(74) *Attorney, Agent, or Firm* — Garlick & Markison; Edward J. Marshall

(57) ABSTRACT

A first advertisement management system assumes control of inserting advertisements into a spot break for a first, pre-allocated portion of the spot break, which has a duration and a scheduled conclusion. The first advertisement management system makes a first determination, based at least in part on a number of advertisements available for insertion into the first pre-allocated portion of the spot break by the first advertisement management system. The first determination indicates whether control of inserting advertisements into the spot break is to be passed to a second advertisement management system at the scheduled conclusion of the first pre-allocated portion of the spot break, prior to the scheduled conclusion of the first pre-allocated portion of the spot break, or later than the scheduled conclusion of the first pre-allocated portion of the spot break. The first advertisement management system passes control to the second advertisement management system in accordance with the first determination.

15 Claims, 11 Drawing Sheets

(56) References Cited

U.S. PATENT DOCUMENTS

| | | | |
|---|---|---|---|
| 6,035,280 | A | 3/2000 | Christensen |
| 6,119,163 | A | 9/2000 | Monteiro et al. |
| 6,185,541 | B1 | 2/2001 | Scroggie et al. |
| 6,324,519 | B1 | 11/2001 | Eldering |
| 6,757,662 | B1 | 6/2004 | Greenwald et al. |
| 6,885,994 | B1 | 4/2005 | Scroggie et al. |
| 2006/0287912 | A1 | 12/2006 | Raghuvamshi |
| 2006/0287915 | A1 | 12/2006 | Boulet et al. |
| 2010/0037253 | A1* | 2/2010 | Sheehan ............. H04H 20/103 725/31 |
| 2010/0205049 | A1 | 8/2010 | Long et al. |
| 2011/0078023 | A1 | 3/2011 | Aldrey et al. |
| 2012/0158461 | A1 | 6/2012 | Aldrey et al. |
| 2013/0097629 | A1* | 4/2013 | Popescu ........... H04N 21/23424 725/32 |
| 2013/0144723 | A1* | 6/2013 | Green ................ G06Q 30/0277 705/14.61 |
| 2014/0089968 | A1* | 3/2014 | Farb ................ H04N 21/44016 725/34 |

OTHER PUBLICATIONS

Optimized Spot Inventory Acquisition and Allocation (Year: 2013).*
Shermach, Kelly; Electronic Coupon Program Offers Data-Base Potential; Sep. 25, 1995; Marketing News; 3 pgs.

* cited by examiner

| | Split Minute Ordering Options | Listen Experience | Category Conflict | Constraints Inventory/ Pacing Mgmt | Rev. Mgmt, Ad Ops POV | NPP POV |
|---|---|---|---|---|---|---|
| 1 | Internal Third Party | Ads>Fill>Ads>Fill | YES | MINIMAL | National buyers at end | Fill and paid ads mixed together |
| 2 | Third Party Internal | Ads>Fill>Ads>Fill | YES | MINIMAL | Local buyers at end | Fill and paid ads mixed together |
| 3 | Internal & Third Party Alternate Positions | Ads>Fill>Ads>Fill | YES | MINIMAL | Alternating buyers at end | Fill and paid ads mixed together |
| 4 | Internal & Third Party Alternate Breaks | Ads, Fill | NO | HIGH- constrains inventory | Constrains Inventory | May lose long form fill due to split |
| 5 | Internal/sellable Third Party/sellable Internal/Fill | Ads>Ads>Fill more likely, though still have Ads>Fill>Ads>Fill | YES | MINIMAL | National buyers at end; more clocks to manage | Dedicated run for long form fill |
| 6 | Third Party/sellable Internal/sellable Third Party/Fill | Ads>Fill | YES | MINIMAL | Revenue and Inventory management - possible additional complexity | Ads do not mix with fill |

FIG. 11

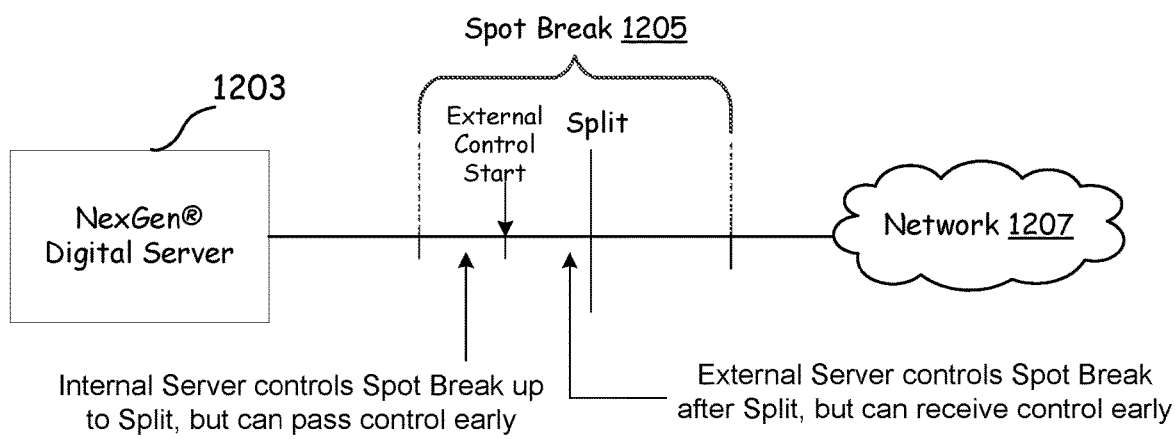

FIG. 12

SPLIT SPOT BREAKS

CROSS REFERENCE TO RELATED APPLICATIONS

The present U.S. Utility Patent Application claims priority pursuant to 35 U.S.C. § 120 as a continuation of U.S. Utility application Ser. No. 14/076,420, entitled "SPLIT SPOT BREAKS", filed Nov. 11, 2013, which is hereby incorporated herein by reference in its entirety and made part of the present U.S. Utility Patent Application for all purposes.

FIELD

This invention relates in general to computer implemented systems, and more particularly, to splitting spot breaks.

BACKGROUND

The Internet is a vast collection of global-spanning networks that communicate with each other by using protocols, such as the Transmission Control Protocol (TCP) and the Internet Protocol (IP). Via its networks, the Internet enables many computers, located at different sites around the world, to access information from each other.

The World Wide Web (i.e., the "WWW" or the "Web") is the fastest growing part of the Internet. The Web works within a client/server model. Web client software runs on the Web client computers, and Web server software runs on the Web server computer. Web client software—known as the Web browser—interacts with both the user and the Web server software. In particular, the Web browser receives a Universal Resource Locator (URL) request from a user. The URL is a unique identifier for requested information. The Web browser then sends the URL request to the Web server software using Hypertext Transfer Protocol (HTTP). In response to the URL request, the Web server software locates and returns the requested information to the Web browser.

The Web contains Web pages that incorporate text, graphics, sound, animation, and other multimedia elements. Many Web pages are formatted in a language called Hypertext Markup Language (HTML). HTML controls the appearance of a Web page. Specifically, HTML controls how information, such as, text, images, and push-buttons are arranged on a Web page. Hypertext links connect the web pages to each other, and to any other pages, graphics, binary files, or multimedia files.

HTML is based on SGML (Standard Generalized Markup Language). SGML allows documents to describe their own grammar—that is, to specify a tag set used in the document, and to specify the structural relationships that those tags represent. SGML makes it possible to define different formats, for each document; to handle large and complex documents; and to manage large information repositories. Full SGML, however, contains many optional features that are not needed for Web applications.

HTML web pages incorporate a small set of tags in conformance with SGML. In general, HTML is well suited for hypertext, multimedia, and the display of small and reasonably simple documents. HTML is not well suited for large, complex documents.

The World Wide Web Consortium (W3C) created a simplified subset of SGML, specially designed for Web applications, and designed for large and complex documents. This subset is called XML (Extensible Markup Language). XML is independent of any platform, vendor, or application. Therefore, XML can be used to exchange information, without regard to the system that the information is coming from or going to. In addition, XML enables the exchange of information, not only between different computer systems, but also enables the exchange of information across different languages.

The Web has provided authors, scientist, academics, and other content providers with a vehicle for distributing their works across a global network. Web users, however, seem to view the Web as analogous to basic cable. For cable, people pay a basic rate for the cable connection, and rarely do they pay additional fees for a particular cable show. Similarly, Web users are willing to pay a basic rate for an Internet connection, but they are less willing to pay additional fees for content. Consequently, advertising is one way that the content provider can generate revenue.

Many content providers seek to increase their advertising revenue by targeting advertisements to users, based on variables such as gender, age, geographic location, etc. In general, content providers can justify high advertising rates by showing that a company's advertisements are being viewed by users that would likely purchase the company's product.

Some content providers obtain targeted advertisements from Internet advertisement providers. Typically, a content provider submits demographic requirements to an advertisement provider, and the advertisement provider furnishes the content provider with a single advertisement that satisfies the demographic requirements. Such a system disadvantageously lacks flexibility and restricts the content provider's options to the single advertisement. Thus, there is a need in the art for a technique of furnishing the content provider with advertising options.

SUMMARY

To overcome the limitations in the prior art described above, and to overcome other limitations that will become apparent upon reading and understanding the present specification, the present invention discloses various methods, apparatuses, and articles of manufacture for providing targeted information to consumers in the same spot break as universal advertisements. In some embodiments, control of a single spot break in programming content delivered both over-the-air and via a media stream are split between two different ad management servers. One of the ad management servers can be configured to deliver universal advertisements, e.g. advertisements delivered to all, or substantially all, consumers regardless of the media over which the programming content is delivered, during one portion of the spot break; while another ad management server can be configured to deliver targeted advertisements to only some of the media consumers. The single spot break can be dynamically split, allowing different stations to receive different proportions of universal and targeted advertisements. Additionally, different spot breaks on the same station can be configured differently based on a tier associated with each of the spot breaks, based on settings associated with individual stations, based on advertisement availability for each of the ad management servers, or the like. Dynamically varying can include varying the relative lengths of the first and second portions of spot breaks In various embodiments, a spot break is split only if it exceeds a threshold length, and the split proportions can be determined based on revenue attributable to advertisements placed by the first and second advertisement management systems. The order in which the portions are arranged, for example whether universal or targeted ads are provided first, can be dynamically varied. In some implementations, even if a particular ad management server is assigned control of a leading, initial, or beginning portion of a spot break, that ad management server can, under certain circumstances, release control to another ad management server earlier than scheduled. In some cases, especially where high-value universal advertisements are provided during the initial portion of the spot break, the ad management server is permitted to retain control for longer than its designated split time, thereby reducing the period of control allotted to a subsequent ad management server.

BRIEF DESCRIPTION OF THE DRAWINGS

Aspects of this disclosure will become apparent upon reading the following detailed description and upon reference to the accompanying drawings, in which like references may indicate similar elements:

FIG. 11 is a table illustrating various considerations relating to split spot break ordering options according to various embodiments of the present disclosure; and FIG. 12 is a diagram illustrating a spot break split according to various embodiments of the present disclosure.

DETAILED DESCRIPTION

Figure 1:
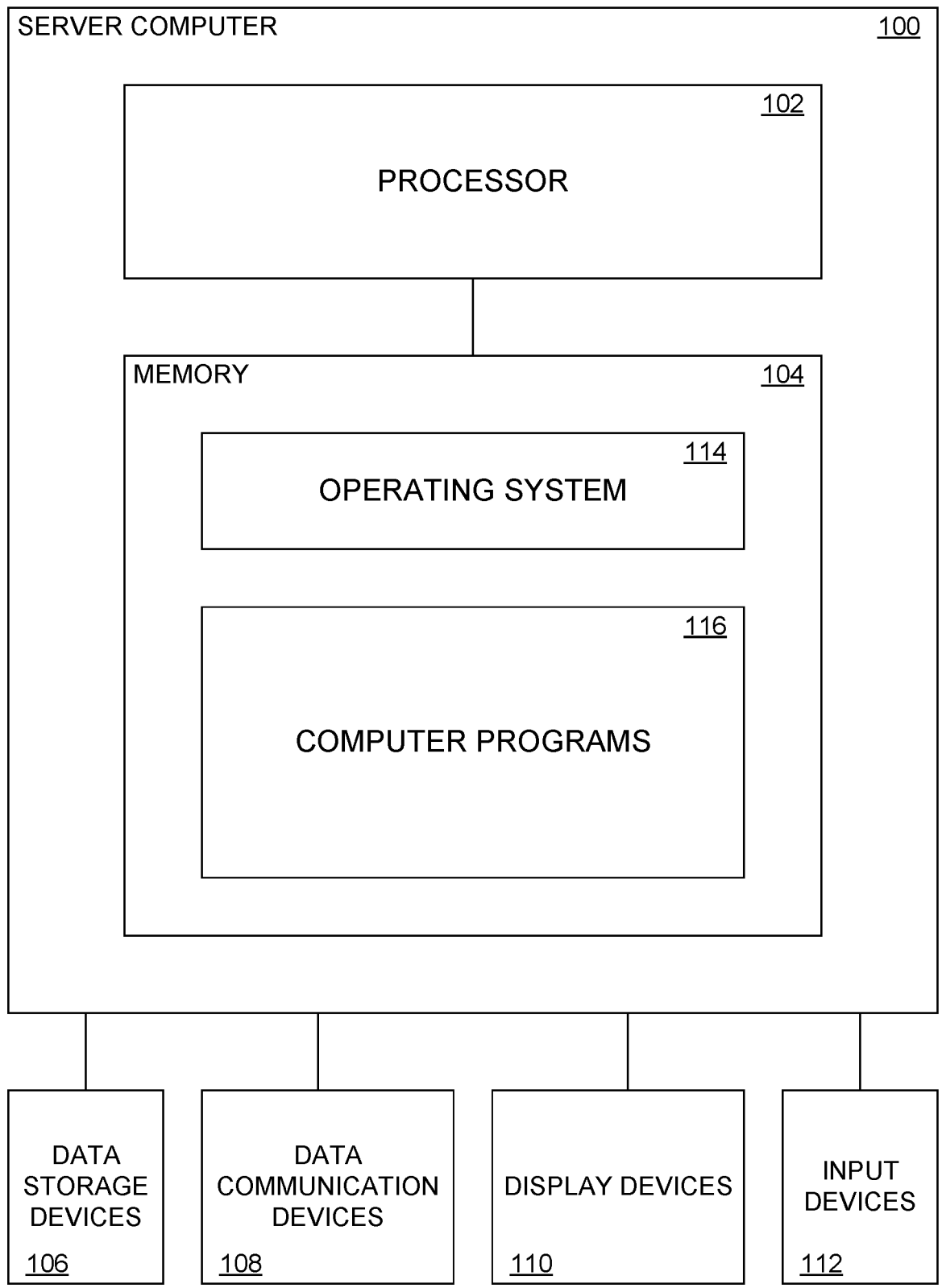
FIG. 1 is a schematic diagram illustrating a hardware environment used to implement a server computer in one embodiment of the invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

One embodiment of this invention is comprised of a collection of components, which will be referred to herein as the "Third Party Advertising System" or "TPAS." It is to be understood that these components may be combined in many different ways to form a variety of combinations within the scope of the invention.

The TPAS enables a user to access a list of targeted advertisement options (also referred to as data items). Initially, the user at a client computer invokes the TPAS. The TPAS then requests logon authorization information from the user. The logon authorization information includes a client identifier (e.g., username and/or password), a client interface version, and the Greenwich Mean Time (GMT). The logon authorization information can also include local time, including, but not limited to Pacific, Mountain, Central, and Eastern Time. Alternatively, the logon authorization information can be unencrypted.

To determine whether a user is an authorized user, the TPAS system compares the client identification information with logon information contained in a database that is connected to the TPAS server computer. When a match exists, the TPAS returns a limited life span key to the user. This limited life span key provides the user with the ability to encrypt data and decipher encrypted data. The limited life span key is active for a pre-defined time duration (e.g., ten minutes). Alternatively, the TPAS system may place a cookie on the user computer to enable requests for targeted advertisements without requiring logon information, thereby allowing the user to remain anonymous.

The user uses the limited life span key to encrypt a request for targeted advertisement options. The request contains parameter requirements, including audience demographic requirements and/or content requirements. The user sends the encrypted request to the TPAS.

In response to the encrypted request, the TPAS compares the parameter requirements with the description of each advertisement stored in the database. The TPAS then uses XML to create a list which contains each advertisement that satisfies the parameter requirements. Advertisements that satisfy the parameter requirements are referred to as targeted advertisements. Of course, a different mark-up language could be used for the list, such as HTML or SGML, without exceeding the scope of this invention.

Next, the TPAS encrypts the XML list, and returns the encrypted list to the client computer. The client computer uses its limited life span key to decrypt the XML list of targeted advertisements.

At this point, the user may select one or more targeted advertisements from the list. The user can then purchase the selected, targeted advertisements from any advertisement provider. When the purchased advertisements are played and/or displayed, the client computer sends a XML report to the TPAS. Of course, a different mark-up language could be used for the report, such as HTML or SGML, without exceeding the scope of this invention.

One advantageous feature of the TPAS includes providing users with a list of targeted advertisements, wherein, each of the targeted advertisements satisfies the user's parameter requirements. In addition, since XML can be used to exchange information, without regard to the system that the information is coming from or going to, the TPAS can be used with any device or appliance that can transmit and receive a XML communication.

Another embodiment of this invention can include a collection of components, referred to herein as a "Third Party Media Distribution System" or "TPMDS." In some embodiments, the TPMDS includes or is used to implement an external ad management system. TPMDS components may be combined in many different ways to form a variety of combinations within the scope of the invention.

The TPMDS can handle the distribution of lists of multiple types of media, including, but not limited to advertisements, music videos, radio programs. Types of advertisements that can be handled and differentiated by the TPMDS can include, but is not limited to promotional advertisements, gateway advertisements, banner advertisements, commercial advertisements, and "jingles." In addition, the TPMDS can accept, differentiate and convert between media of different audio formats, including, but not limited to WAV, WMP, WMA, Real, QT, MP3, MP4, Liquid, and Emblaze formats; the TPMDS can also accept, differentiate and convert media of different file wrapper formats, including, but not limited to RSS and MP4 formats; the TPMDS can also accept, differentiate and convert between various streaming protocols, including but not limited to RTSP, RTMP, MMS, RTP, UDP, TCP, HDS, and HLS. For example, the TPMDS enables a user to access a list of targeted media item options (also referred to as data items), and compares parameter requirements with media item information stored in a database. The TPMDS can also handle the distribution of media items using servers other than the server within which the TPMDS is located, including servers transmitting dynamic media streams, as the database can retrieve information on media items to be retrieved using other servers. Finally, the TPMDS can receive and transmit information with client devices other than computers, such as consumer devices, which can include appliances, personal digital assistants (PDAs), wrist watches, stand-alone Internet radios, set top boxes, and television systems. The TPMDS enables a user to access a list of targeted advertisement options (also referred to as data items).

Initially, the user at a client computer invokes the TPMDS. The TPMDS then requests logon authorization information from the user. The logon authorization information includes a client identifier (e.g., username and/or password), a client interface version, and the Greenwich Mean Time (GMT). The logon authorization information can also include local time, including, but not limited to Pacific, Mountain, Central, and Eastern Time. Alternatively, the logon authorization information can be unencrypted.

To determine whether a user is an authorized user, the TPMDS system compares the client identification information with logon information contained in a database that is connected to the TPMDS server computer. When a match exists, the TPMDS returns a limited life span key to the user. This limited life span key provides the user with the ability to encrypt data and decipher encrypted data. The limited life span key is active for a pre-defined time duration (e.g., ten minutes). Alternatively, the TPMDS system may place a cookie on the user computer to enable requests for targeted media items without requiring logon information, thereby allowing the user to remain anonymous.

The user uses the limited life span key to encrypt a request for targeted media item options. The request contains parameter requirements, including audience demographic requirements and/or content requirements. The request can also contain media requirements, including, but not limited to specific media type, including, but not limited to specific audio format and file wrapper format. For example, a user may request targeted commercial spots that are of a specific file wrapper format and audio format. The user sends the encrypted request to the TPMDS.

In response to the encrypted request, the TPMDS compares the parameter requirements with the description of each media item stored in the database. The TPMDS then uses XML to create a list which contains each media item that satisfies the parameter requirements. Media items that satisfy the parameter requirements are referred to as targeted media items. Of course, a different mark-up language could be used for the list, such as HTML or SGML, without exceeding the scope of this invention.

Next, the TPMDS encrypts the XML list, and returns the encrypted list to the client computer. The client computer uses its limited life span key to decrypt the XML list of targeted media items.

At this point, the user may select one or more targeted media items from the list. The user can then purchase the selected, targeted media items from any media item provider. When the purchased media items are played and/or displayed, the client computer sends a XML report to the TPMDS. Of course, a different mark-up language could be used for the report, such as HTML or SGML, without exceeding the scope of this invention.

Before providing the details of the TPAS and the TPMDS, the hardware environments used to implement a client computer, client device, and a server computer in one embodiment of the present invention are discussed.

FIG. 1 is a schematic diagram illustrating a hardware environment used to implement a server computer 100 in one embodiment of the invention. The present invention is typically implemented using a server computer 100, which generally includes a processor 102, a random access memory (RAM) 104, data storage devices 106 (e.g., hard, floppy, and/or CD-ROM disk, drives, etc.) data communications devices 108 (e.g., modems, network interfaces, etc.), display devices 110 (e.g., CRT, LCD display, etc.), and input devices 112 (e.g., mouse pointing device, keyboard, CD-ROM drive, etc.). It is envisioned that attached to the server computer 100 may be other devices, such as read only memory (ROM), a video card, bus interface, printers, etc. Those skilled in the art will recognize that any combination of the above components, or any number of different components, peripherals, and other devices, may be used with the server computer 100.

The server computer 100 operates under the control of an operating system (OS) 114. The operating system 114 is booted into the memory 104 of the server computer 100 for execution when the server computer 100 is powered-on or reset. In turn, the operating system 114 then controls the execution of one or more computer programs 116, such as the comparison software for comparing the parameter requirements with available advertisements, and list software for creating a XML list of targeted advertisements. The present invention is generally implemented in these computer programs 116, which execute under the control of the operating system 114, and cause the server computer 100 to perform the desired functions as described herein.

The operating system 114 and computer programs 116 are comprised of instructions which, when read and executed by the server computer 100, cause the server computer 100 to perform the steps necessary to implement and/or use the present invention. Generally, the operating system 114 and/or computer programs 116 are tangibly embodied in and/or readable from a device, carrier, or media such as memory 104, data storage devices 106, and/or data communications devices 108. Under control of the operating system 114, the computer programs 116 may be loaded from the memory 104, data storage devices 106, and/or data communications devices 208 into the memory 204 of the server computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein, is intended to encompass a tangible computer storage medium that stores a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 1 is not intended to limit the present invention. Indeed, those skilled in the art will recognize that other alternative hardware environments may be used without departing from the scope of the present invention.

Figure 2:
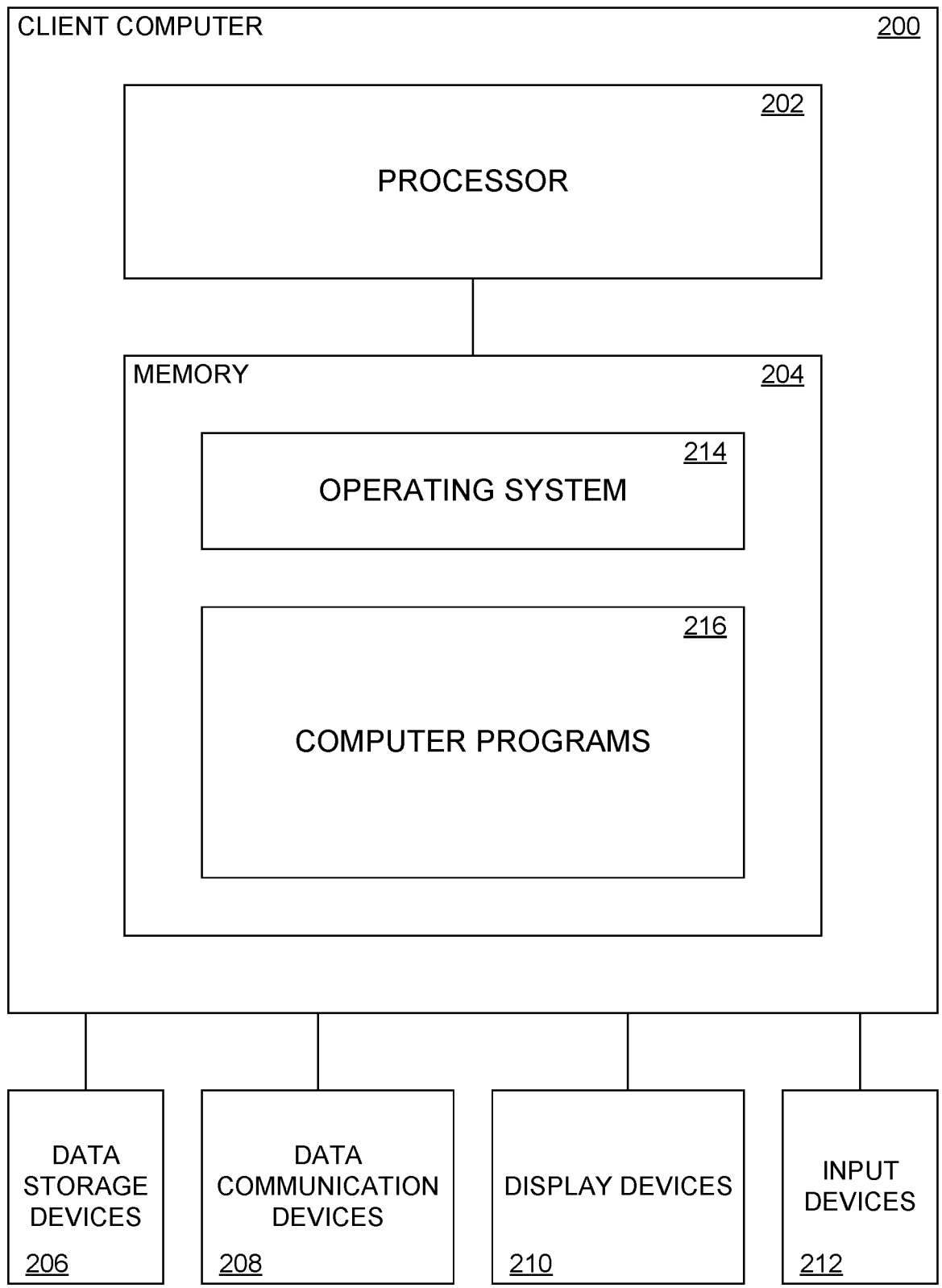
FIG. 2 is a schematic diagram illustrating a hardware environment used to implement a client computer in one embodiment of the invention.

FIG. 2 is a schematic diagram illustrating a hardware environment used to implement a client computer 200 in one embodiment of the invention. The present invention is typically implemented using a client computer 200, which generally includes a processor 202, a random access memory (RAM) 204, data storage devices 206 (e.g., hard, floppy, and/or CD-ROM disk, drives, etc.), data communications devices 208 (e.g., modems, network interfaces, etc.), display devices 210 (e.g., CRT, LCD display, etc.), and input devices 212 (e.g., mouse pointing device, keyboard, CD-ROM drive, etc.). It is envisioned that attached to the client computer 200 may be other devices, such as read only memory (ROM), a video card, bus interface, printers, etc. Those skilled in the art will recognize that any combination of the above components, or any number of different components, peripherals, and other devices, may be used with the client computer 200.

The client computer 200 operates under the control of an operating system (OS) 214. The operating system 214 is booted into the memory 204 of the client computer 200 for execution when the client computer 200 is powered-on or reset. In turn, the operating system 214 then controls the execution of one or more computer programs 216, such as software for reporting when an advertisement has been played/displayed. The present invention is generally implemented in these computer programs 216, which execute under the control of the operating system 214, and cause the client computer 200 to perform the desired functions as described herein.

The operating system 214 and computer programs 216 are comprised of instructions which, when read and executed by the client computer 200, cause the client computer 200 to perform the steps necessary to implement and/or use the present invention. Generally, the operating system 214 and/or computer programs 216 are tangibly embodied in and/or readable from a device, carrier, or media such as memory 204, data storage devices 206, and/or data communications devices 208. Under control of the operating system 214, the computer programs 216 may be loaded from the memory 204, data storage devices 206, and/or data communication devices 208 into the memory 204 of the client computer 200 for use during actual operations.

Thus, the present invention may be implemented as a method, apparatus or article of manufacture, using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 2 is not intended to limit the present invention. Indeed, those skilled in the art will recognize that other alternative hardware environments may be used without departing from the scope of the present invention.

Figure 5:
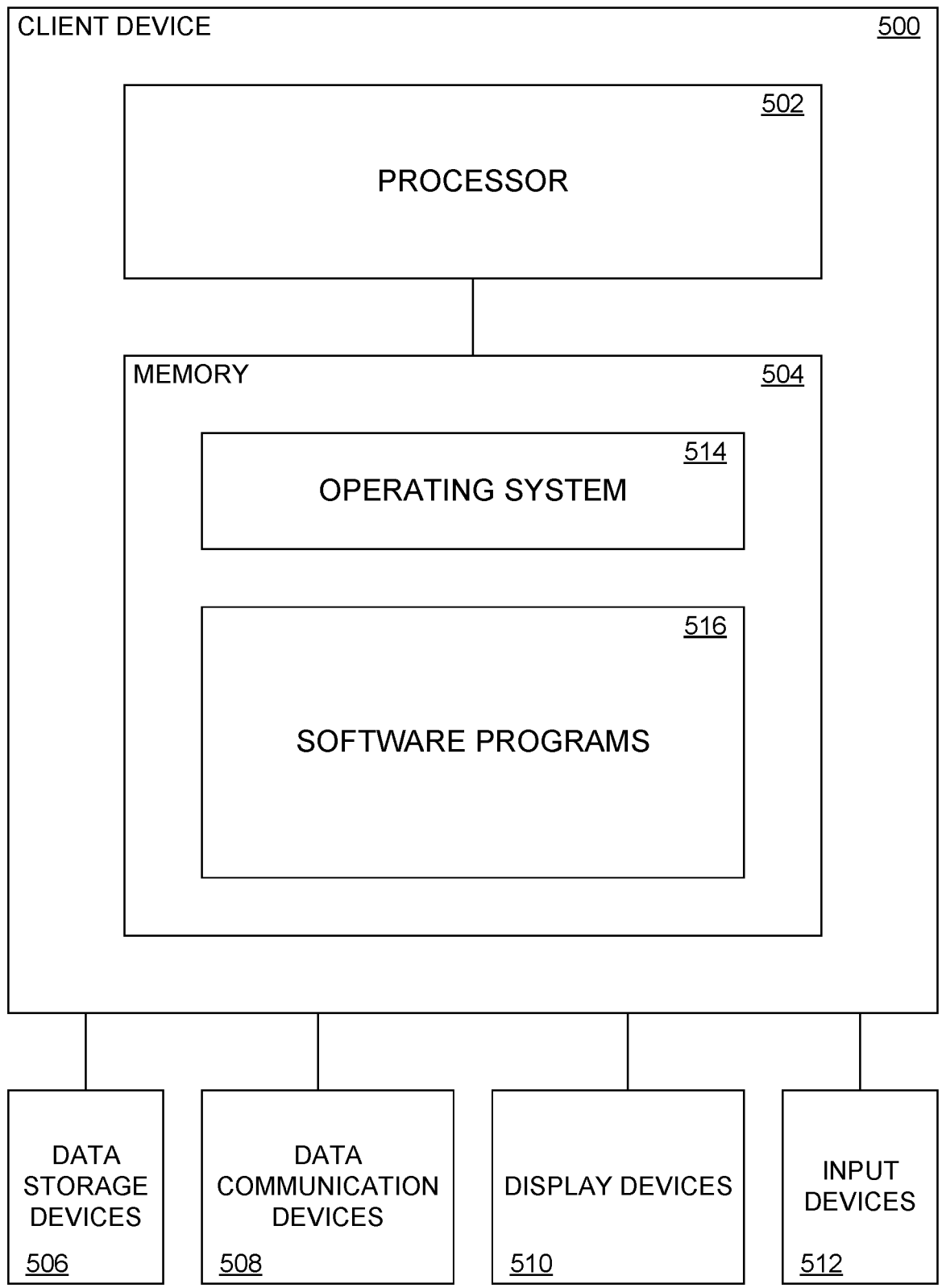
FIG. 5 is a schematic diagram illustrating a hardware environment used to implement a client device in one embodiment of the invention.

FIG. 5 is a schematic diagram illustrating a hardware environment used to implement a client device 500. Client device 500 can be a consumer device, such as an appliance, a personal digital assistant (PDA), a wrist watch, a stand-alone Internet radio, a set top box, or a television system, or other consumer device, as well as a general computing device such as personal computers including but not limited to a laptop computer, a desktop computer, or a tablet device. Client device 500 generally includes a processor 502, a random access memory (RAM) 504, data storage devices 506 (e.g., hard, floppy, and/or CD-ROM disk, drives, etc.), data communications devices 508 (e.g., modems, network interfaces, etc.), display devices 510 (e.g., CRT, LCD display, etc.), and input devices 512 (e.g., mouse pointing device, keyboard, CD-ROM drive, etc.). Other devices, such as read only memory (ROM), a video card, bus interface, printers, etc. can be attached to or included in client device 500. Those skilled in the art will recognize that various combinations of the above components, or any number of different components, peripherals, and other devices, may be used with the client device 500.

Client device 500 operates under control of an operating system (OS) 514. Operating system 514 can be booted into the memory 504 of the client device 500 for execution when the client device 500 is powered-on or reset. In turn, operating system 514 can control the execution of one or more software programs 516, such as software for reporting when an advertisement has been played or displayed. Various embodiments are implemented as software programs 516, which execute under control of operating system 514, and cause client device 500 to perform desired functions, some of which are described herein.

Operating system 514 and software programs 516 include instructions which, when read and executed by client device 500, cause client device 500 to perform operations useful in implementing various embodiments of the present invention. The operating system 514 and software programs 516 can take the form of a computer readable medium, which is readable from a device, carrier, or media such as memory 504, data storage devices 506, data communications devices 508. Under control of the operating system 514, the software programs 516 may be loaded from the memory 504, data storage devices 506, data communication devices 508 into the memory 504 of the client device 500 for use during actual operations.

Thus, various embodiments can be implemented as a method, apparatus or article of manufacture, using standard programming or engineering techniques to produce software, firmware, hardware, or any combination thereof. The term "article of manufacture" (or alternatively, "software program product") as used herein, is intended to encompass a software program accessible from any computer-readable device, carrier, or media. Of course, those skilled in the art will recognize many modifications may be made to this configuration without departing from the scope of the present invention.

Those skilled in the art will also recognize that the environment illustrated in FIG. 5 is not intended to limit the present invention. Indeed, those skilled in the art will recognize that other alternative hardware environments may be used without departing from the scope of the present invention.

Figure 3:
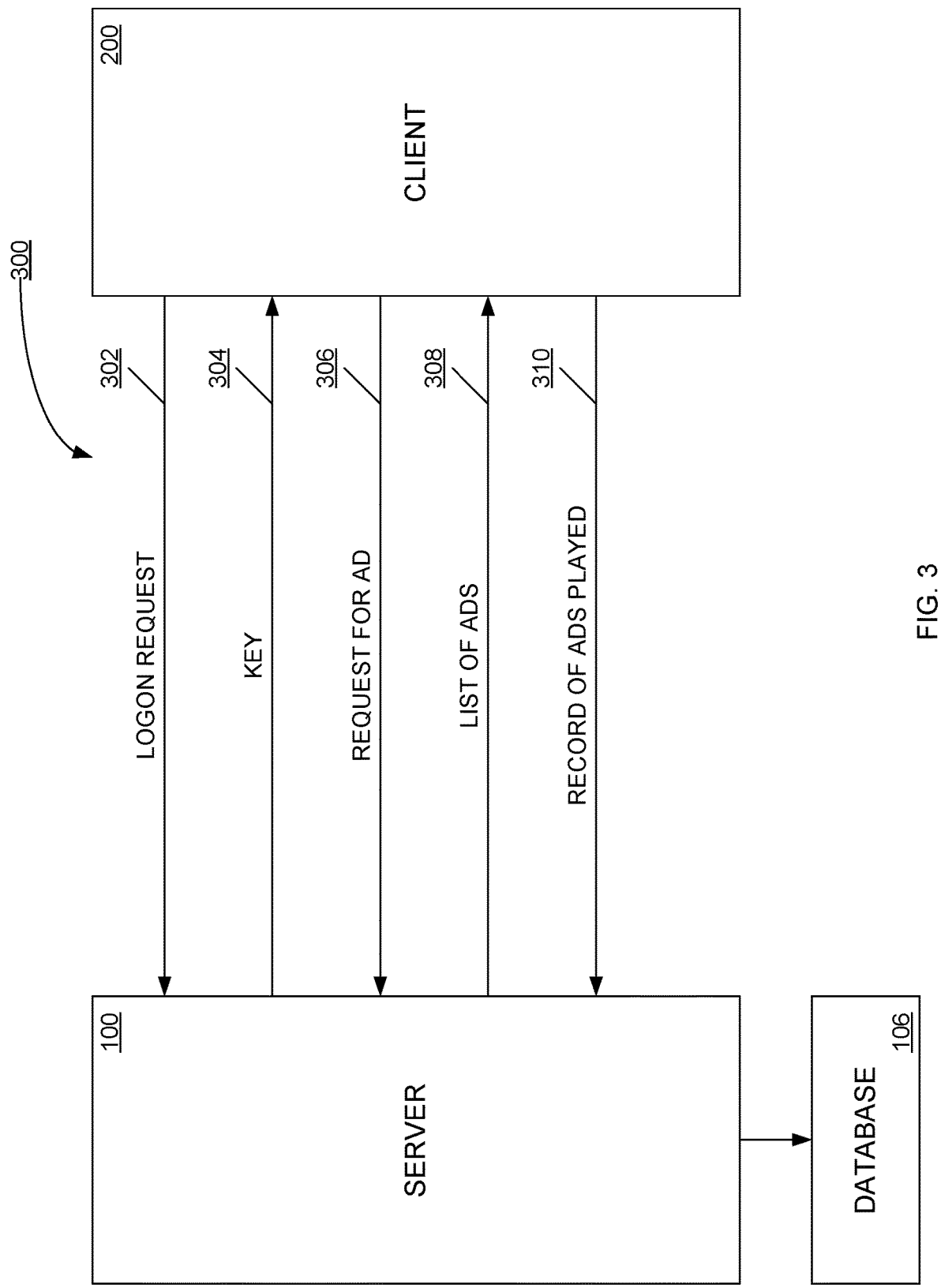
FIG. 3 is a schematic diagram illustrating a client/server computer environment of an embodiment of the present invention.

FIG. 3 is a schematic diagram illustrating a client/server computer environment of an embodiment of the present invention, and more particularly, illustrates a typical distributed computer system 300 using the Internet to connect the server computer 100 to the client computer 200.

The server computer 100 is connected to a database 106 that contains user logon authorization information and information about the available data items. In FIG. 3, the data items are advertisements. Those skilled in the art will recognize that other data items may be used without departing from the scope of the present invention.

The logon authorization information includes client identifiers (e.g., usernames and passwords) for users that are authorized to access the TPAS system. The advertisement information includes, but is not limited to the following: (1) the title of the advertisement; (2) the spot identification number; (3) the flight identification number; (4) the spot Universal Resource Locator (URL); (5) the click action URL; (6) the duration; and (7) the description.

The title of the advertisement provides a descriptive title and the spot identification number is based on the type of advertisement. For example, a banner advertisement may have a different spot identification number than an audio advertisement. The flight identification number is associated with the following: the target audience of an advertisement; the period of time during which a particular advertisement is played/displayed; and the number of times that the advertisement will be played/displayed. The spot URL and the click action URL define the location of the advertisement. The duration defines the time length (e.g., five seconds) of the advertisement. The description contains a written description, possibly provided by the advertiser, possibly automatically provide by information stored within the TPAS system or gathered from information received by third party sources from outside of the TPAS system.

A user at a client computer 200 invokes the TPAS. The user could be a content provider, such as an Internet radio station or a music on demand Web site, an audio server that provides content to a broadcast chain, a cloud-based media provider, or a Web site that provides content. Alternatively, the user can be a consumer, including an advertiser. At the server computer 100, the TPAS system requests the logon authorization information from the user. The logon authorization information includes the user's interface version, client identifier, and GMT time. Arrow 302 represents the client computer 200 sending a logon request to the server computer 100. It is noted that all communication between the client computer 200 and the server 100 computer is in XML, and each communication has a specific header that identifies the content of the communication. For example, the communication may be a logon communication, a request communication, etc.

To determine whether a user is an authorized user, the TPAS system compares the client identifier information with the logon authorization information contained in the database 106. When a match exists, the TPAS returns a limited life span key to the user, as represented by Arrow 304. This limited life span key provides the user with the ability to encrypt data and decipher encrypted data. The limited life span key is active for a predefined time duration (e.g., ten minutes).

The user uses the limited life span key to encrypt and send a request for targeted advertisement options, as represented by Arrow 306. The request contains parameter requirements, including audience demographic requirements and/or content requirements. The audience demographic requirements include, but are not limited to, age, gender, geographic location, interests, education, income, and musical format.

In one embodiment, the location demographic requirement includes the real time location. For example, assume that the content provider seeks to provide an advertisement to someone that is standing in front of a coffee shop. The content provider will then request advertisement options that are related to that particular coffee shop.

The musical format, includes any compressed format (e.g., WMP, WMA, WAV, Real, QT, MP3, MP4, Liquid, or Emblaze). Other content requirements include, but are not limited to, spot type, gateway, inserted, audio or video, audio format, file wrapper format, graphic, encoding, encoding rate, and Codec. Exemplary spot types include, but are not limited to, a promotional advertisement, a gateway advertisement, a banner advertisement, a commercial advertisement, or a "jingle."

The TPAS compares the parameter requirements with the advertisement descriptions.

The TPAS then uses XML to create a list that contains each advertisement which satisfies the parameter requirements. Each advertisement is tagged (or affixed) with its advertisement information.

Next, the TPAS encrypts the XML list, and returns the encrypted list to the client computer, as represented by Arrow 308. The client computer uses its limited life span key to decrypt the XML list of targeted advertisements.

The user may select one or more targeted advertisements from the list. The user can then purchase the selected, targeted advertisements from any advertisement provider. When the purchased advertisements are played and/or displayed, the client computer sends a XML report to the TPAS, as represented by Arrow 310. The report is a specified XML schema that includes, but is not limited to: the client identification number, the spot identification number, the flight identification number, the start and stop play/display time in GMT, and the number of times that the advertisements was played/displayed.

Figure 6:
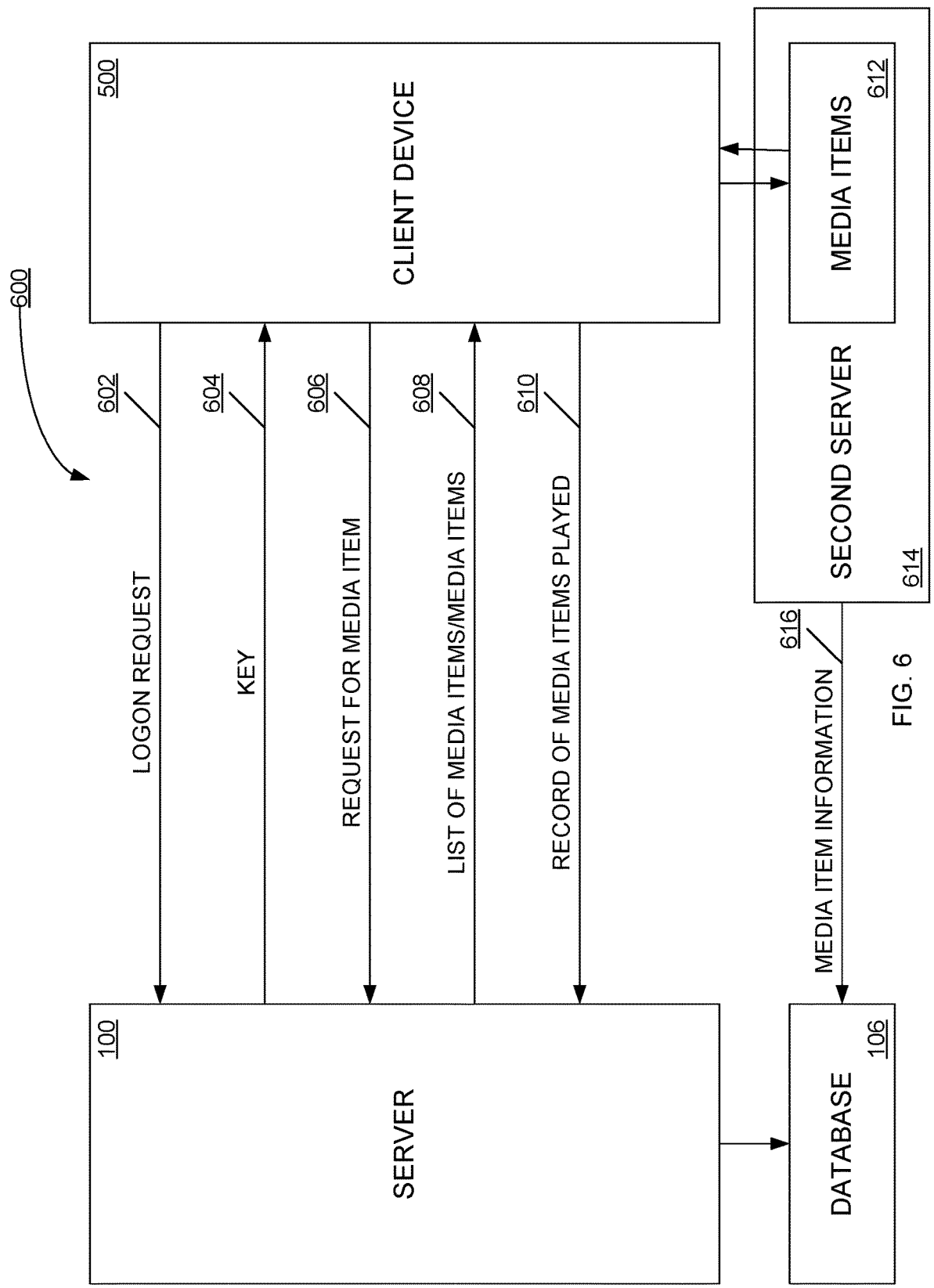
FIG. 6 is a schematic diagram illustrating a client/server computer environment of an embodiment of the present invention.

FIG. 6 is a schematic diagram illustrating a client/server computer environment of an embodiment of the present invention, and more particularly, illustrates a typical distributed computer system 600 using the Internet to connect the server computer 100 to the client device 500.

The server computer 100 is connected to a database 106 that contains user logon authorization information and information about the available data items. In FIG. 6, the data items are media items 612, which are retrieved using a second server 614. The second server 614 can be the server computer 100. Information on media items 612 that are retrieved using second servers 614 other than server computer 100 can be retrieved using the second servers 614 and stored on the database 106. Those skilled in the art will recognize that other data items may be used without departing from the scope of the present invention.

The logon authorization information may include client identifiers (e.g., usernames and passwords) for users that are authorized to access the TPMDS system. The media item information includes, but is not limited to the following: (1) the title of the media item; (2) the media item identification number; (3) the flight identification number; (4) the media item Universal Resource Locator (URL); (5) the click action URL; (6) the duration; and (7) the description.

The title of the media item may provide a descriptive title and the media item identification number is based on the type of media. For example, a talk radio program may have a different media item identification number than a music video. The flight identification number is associated with the following: the target audience of a media item; the period of time during which a particular media item is played/displayed; and the number of times that the media item 612 will be played/displayed. The spot URL and the click action URL define the location of the media item 612; they can also define the location of the media item if the media item 612 is to be retrieved using a second server 614 that is not the server computer 100. The duration defines the time length (e.g., ten minutes) of the media item. A spot block identifier can also be included. The description contains a written description, possibly provided by the media provider.

In some embodiments, the TPAS may be configured to respond to spot break split information received from broadcast automation software. The spot break split information can include information indicating which portion of as spot break is reserved for the TPAS to use for inserting targeted advertisements.

A user at a client device 500 invokes the TPMDS. The user could be a media provider, such as an Internet radio station or a music on demand Web site, an audio server, or a Web site that provides media. Alternatively, the user can be a consumer, an advertiser or a client. At the server computer 100, the TPMDS system requests the logon authorization information from the user. The logon authorization information may include the user's interface version, client identifier, and GMT time. Arrow 602 represents the client device 500 sending a logon request to the server computer 100. It is noted that some or all communication between the client device 500 and the server 100 computer may be in XML, and may have a specific header that identifies the content of the communication. For example, the communication may be a logon communication, a request communication, etc.

To determine whether a user is an authorized user, the TPMDS system compares the client identifier information with the logon authorization information contained in the database 106. When a match exists, the TPMDS returns a limited life span key to the user, as represented by Arrow 604. This limited life span key provides the user with the ability to encrypt data and decipher encrypted data. The limited life span key is active for a predefined time duration (e.g., ten minutes).

The user may use the limited life span key to encrypt and send a request for targeted media options, as represented by Arrow 606. The request contains parameter requirements, including audience demographic requirements and/or media requirements. The audience demographic requirements include, but are not limited to, age, gender, geographic location, interests, education, income, and musical format.

In one embodiment, the location demographic requirement includes the real time location. For example, assume that the media provider seeks to provide a media item to someone that is living in the state of New York. The media provider will then request media options that are related to the state of New York.

The musical format includes any compressed format (e.g., WMP, Real, QT, MP3, MP4, Liquid, or Emblaze). Other media requirements include, but are not limited to, media type, gateway, inserted, audio or video, audio format, file wrapper format, graphic, encoding, encoding rate, and Codec. Exemplary media types include, but are not limited to, an advertisement, a music video, a song, or a radio program.

The TPMDS can compare the parameter requirements with the media item information on the database 106. The TPMDS may then use XML to create a list that contains an entry for each media item which satisfies the parameter requirements. Each media item entry can be tagged (or affixed) with its media item information. If a media item 612 is to be retrieved using a second server 614 that is not the sever computer 100, the media item information tagged with the media item entry can include the identification of the second server 614 through which the media item 612 is to be retrieved.

Next, the TPMDS encrypts the XML list, and returns the encrypted list to the client device 500, as represented by arrow 608. The client device 500 uses its limited life span key to decrypt the XML list of targeted media item entries.

The user may select one or more targeted media item entries from the list. The user can then purchase or otherwise obtain the selected, targeted media item 612 from any media provider, including those media items located on a second server 614. When the media items 612 are played or displayed, the client computer may send a report, e.g., a XML report, to the TPMDS, as represented by arrow 610. The report may be a specified XML schema that includes, but is not limited to: the client identification number, the media item identification number, the flight identification number, the start and stop play/display time in GMT, and the number of times that the media item was played/displayed.

Figure 4:
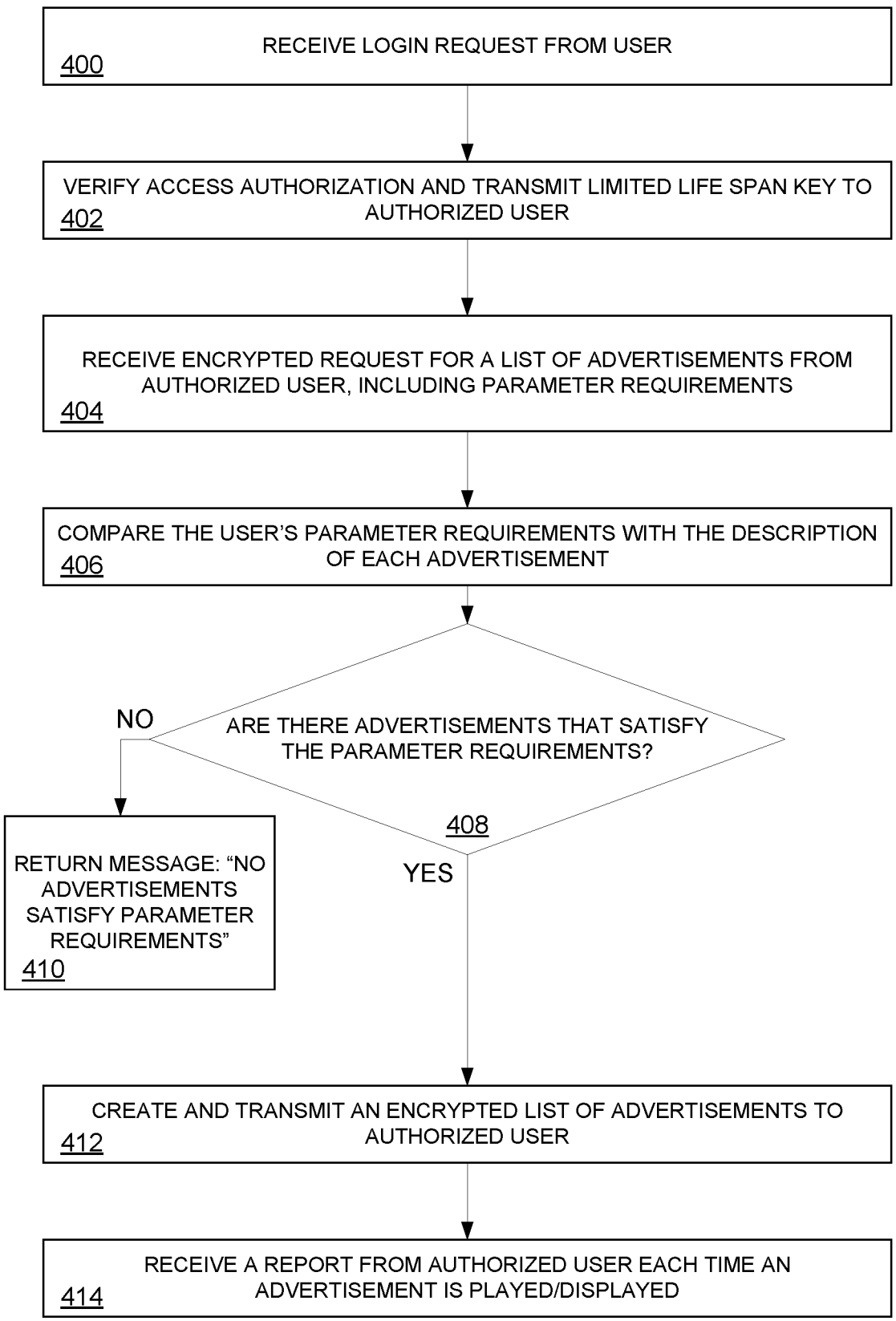
FIG. 4 is a flow diagram illustrating the process performed by the Third Party Advertising System.

FIG. 4 is a flow diagram illustrating the process performed by the TPAS. Block 400 represents the TPAS receiving a logon request from a user. When the user is an authorized user, the TPAS transmits a limited life span encryption key, as represented by Block 402.

Block 404 represents the TPAS receiving an encrypted request for a list of targeted advertisements from the authorized user. The request includes parameter requirements, including audience demographic requirements and content requirements. The TPAS then compares the parameter requirements with the descriptions of each advertisement, as represented by Block 406.

Block 408 is a decision block that represents the TPAS determining whether there are any advertisements that satisfy the parameter requirements. When there are advertisements that satisfy the parameter requirements, the TPAS creates and transmits the list of targeted advertisements to the authorized user, as represented by Block 412. The TPAS then proceeds to Block 414.

Block 414 represents the TPAS system receiving an XML report from the authorized user each time a targeted advertisement is played and/or displayed, attempts to play or display, or is otherwise ordered, requested, or scheduled to play or display.

Otherwise, when no advertisements satisfy the parameter requirements, the TPAS may return a message stating that: "no advertisements satisfy the parameter requirements," or other similar message, as represented by Block 410.

Figure 7:
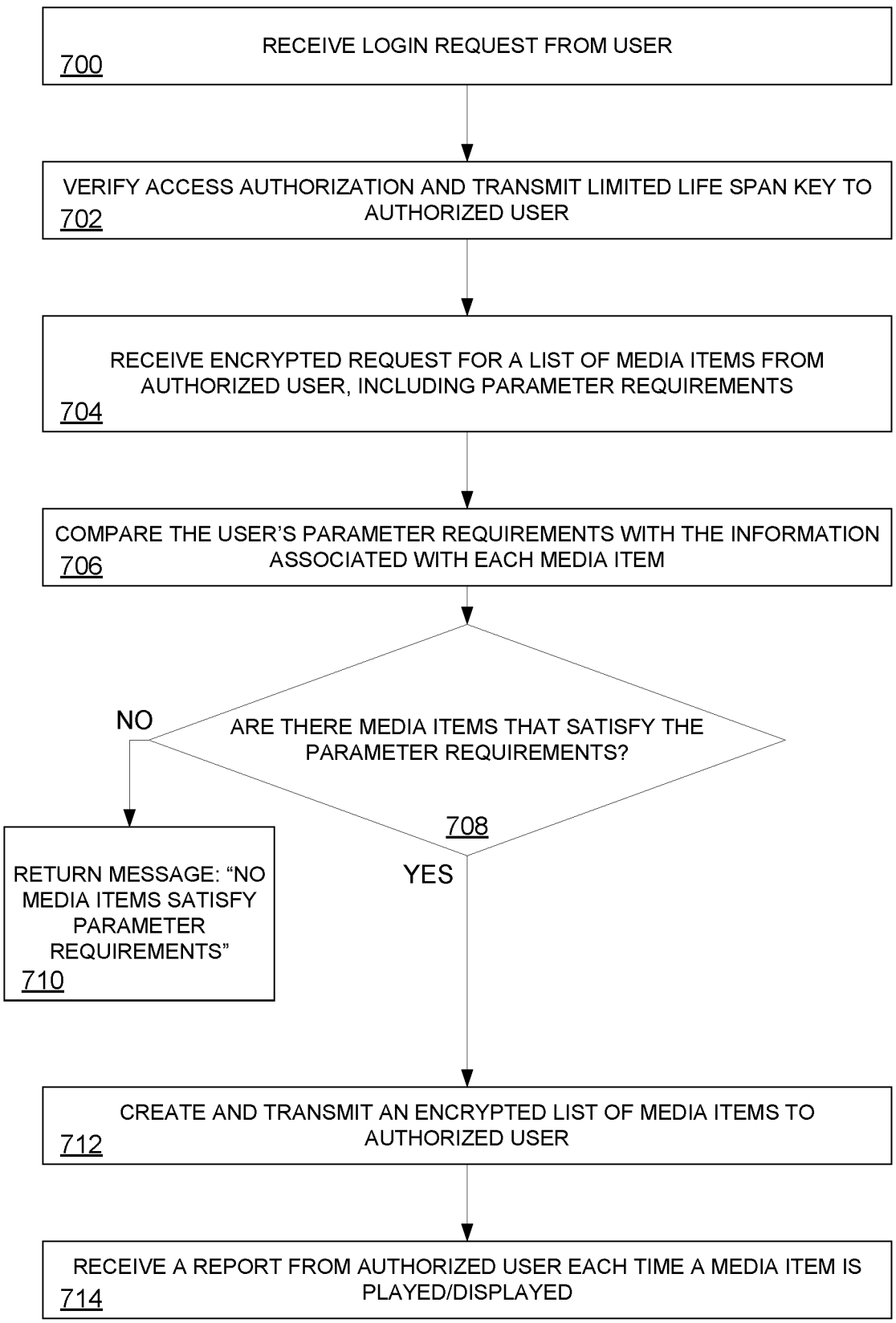
FIG. 7 is a flow diagram illustrating the process performed by the Third Party Media Distribution System.

FIG. 7 is a flow diagram illustrating the process performed by the TPMDS. Block 700 represents the TPMDS receiving a logon request from a user. When the user is an authorized user, the TPMDS transmits a limited life span encryption key, as represented by Block 702.

Block 704 represents the TPMDS receiving an encrypted request for a list of targeted media items from the authorized user. The request includes parameter requirements, including audience demographic requirements and content requirements. The TPMDS then compares the parameter requirements with the descriptions of each media item, as represented by Block 706.

Block 708 is a decision block that represents the TPMDS determining whether there are any media items that satisfy the parameter requirements. When there are media items that satisfy the parameter requirements, the TPMDS may create and transmit the list of targeted media items, including information on the location of the targeted media items, to the authorized user, as represented by Block 712. The TPMDS then proceeds to Block 714.

Block 714 represents the TPMDS system receiving an XML report from the authorized user each time a targeted media item is played and/or displayed, or attempts to play or display, or is otherwise ordered, requested or scheduled to play or display.

Otherwise, when no media items satisfy the parameter requirements, the TPMDS may return a message stating that: "no media items satisfy the parameter requirements," or other similar message, as represented by Block 710.

Referring next to FIGS. 8-12, various methods, systems, and devices for splitting a single spot break, will be discussed. Those skilled in the art will appreciate that streaming spots are generally of a one-to-many listener distribution process. However, it is possible to send a signal and target ads using a one-to-one listener distribution. Various embodiments described herein allow the particular type of ad delivery process used (e.g. one-to-many or one-to-one) to be varied within a single spot break. The way in which a spot break is split up can be determined based on size (length) allocated to spot versus commercials sold at each rate, and may use an internal ad management system priority code. Part of the spot break may be allocated to an internal ad management system and the rest to an external ad management system, or the whole spot break may be allocated to either an internal ad management system or an external ad management system.

In some embodiments, control of different spot breaks within a particular period of time can be implemented in a manner similar to splitting a single spot break. For example if there are two spot breaks within an hour, they can be split so that the first spot break in its entirety corresponds to the first portion of a single spot break, and is controlled by a first ad management server, while the second spot break in its entirety corresponds the second portion of a single spot break, and ads are inserted into the second spot break under control of a second ad management server. Other time periods in which control of different spot breaks can be split between different ad management servers include any of various dayparts, As opposed to more conventional techniques, in which insertion of advertisements is performed under control of a single entity, the techniques described in the following discussion can be used to allow, for example, one entity to insert universally applicable advertisements into one part of a spot break, while another entity can insert targeted advertisements into another portion of the spot break. In various embodiments, either or both of the first and second entities can insert filler in addition to, or in place of, advertisements.

The phrase, "universally applicable advertisements" and other similar terms are used herein to refer to advertisements intended for an entirety of an audience consuming media presented on a particular channel, or station, while the phrase "targeted advertisements" refers to advertisements selected for a subset of the entire audience, such as a group of listeners having one or more similar demographic attributes, or with granularity that can be as small as an individual listener. It will be appreciated that universally applicable advertisements may be targeted to the extent that they are targeted to the majority of media consumers receiving media content from the broadcast or stream, but such "universal targeting" is performed at a different level of granularity. Another distinction between universal advertisements and targeted advertisements (keeping in mind that universal advertisements can be targeted broadly to an entire audience) is that different targeted advertisements can be provided, concurrently or non-concurrently, to different media consumers of particular media programming, while universal advertisements are intended to be provided to the audience as a whole.

The difference between universal advertisements and targeted advertisements, as those terms are used herein, can be understood by considering an example in which a single advertisement is provided to consumers of a program on both a broadcast channel, and on each and every individual stream representing that particular broadcast channel. By contrast, targeted advertisements refer to advertisements that can be provided to different consumers of the same or different media streams based on more individualized consumer preferences and/or demographics. Assume, for example 70% of the listeners to a classic rock radio station may be between the ages of 30 and 45. Thus, universal advertisements can be selected to appeal to that 70% of listeners. Assuming, however, that 10% of the listeners are listening online via a streaming media player, and those listeners have identifiable preferences and demographics that do not match the 70%, those listeners can each be provided with individually customized advertisements, or demographically customized advertisements, during at least a portion of the spot break.

As used in the following discussion, reference to controlling a spot break refers generally to controlling which advertisements are inserted into one or more portions of the spot break, and in some cases the order in which those advertisements are inserted within that portion. Reference to splitting a spot break refers to dividing control of a block of time in a media broadcast or stream that is used generally for presenting advertisements, and in some cases filler, to media consumers. In some cases splitting a spot break also refers to dividing spot break into universal and targeted portions. Note that splitting a spot break does not include splitting a spot break between advertisements and filler, with no split in control or universal/targeted content. Furthermore, although some of the embodiments discussed herein involve splitting a spot break into two different portions, the techniques are equally applicable to splitting a spot break into more than two portions. For example, a single spot break can be split into three, four, five or more spots.

Additionally, a spot break divided into multiple portions can be combined or recombined, either partially or fully, to decrease the number of different portions. For example, if a spot break is divided into 4 different portions, the last three portions can be recombined, leaving the original first portion and a recombined second portion. Similarly, the middle two portions can be combined, leaving the original beginning and end portions, and a single recombined middle portion. Recombining different portions can be performed when an ad management system assigned to control one of the portions does not have sufficient content, or sufficient quality of content, for insertion during its assigned portion of the spot break. Combining two spot break portions can be performed on-the-fly, and can include passing control of an assigned portion of a spot break either early or late, or passing control to a standby system.

Figure 8:
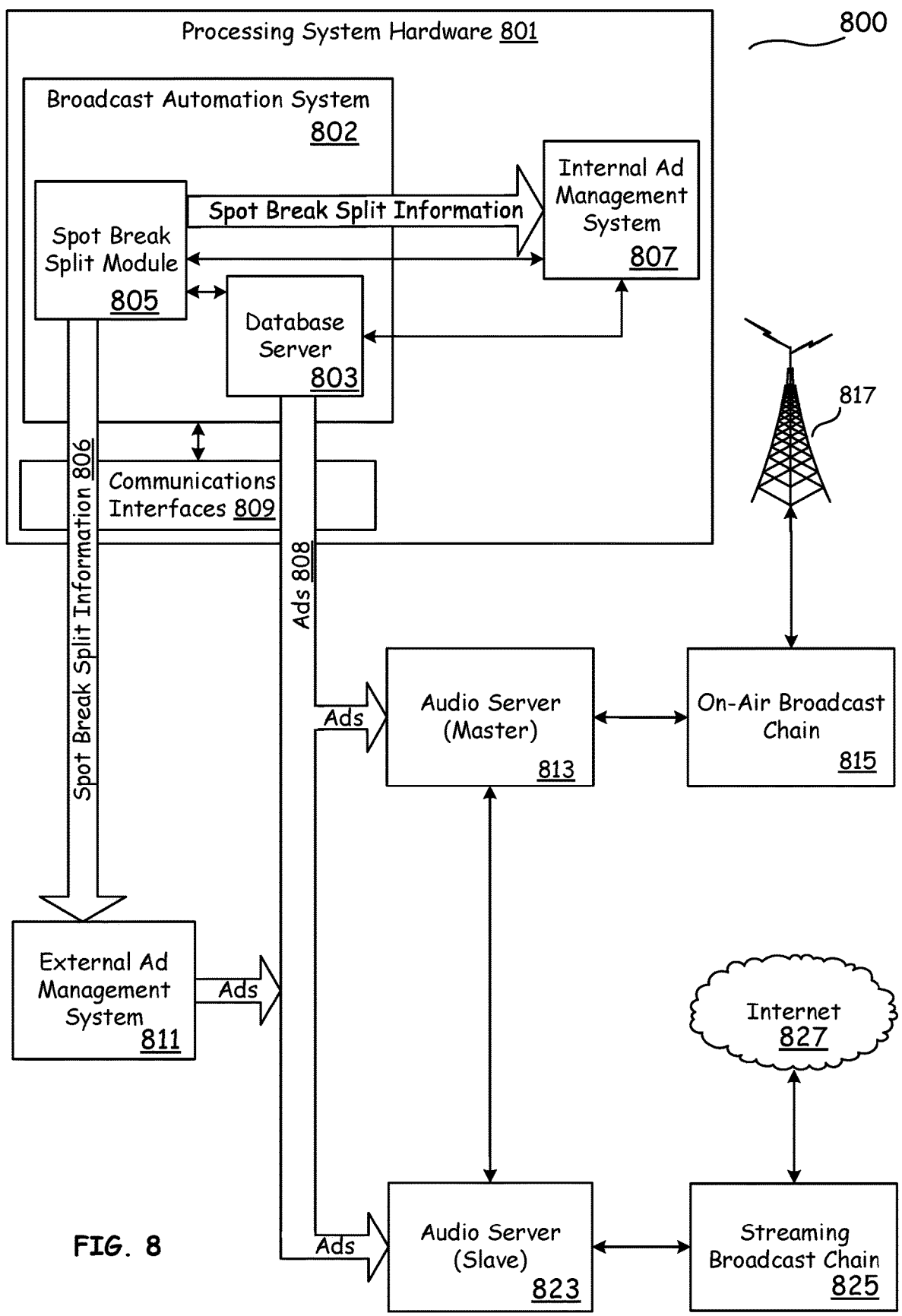
FIG. 8 is a block diagram illustrating a system implementing split spot breaks according to various body the present disclosure.

Referring to FIG. 8, an implementation of a system 800 configured to split control of a single spot break is illustrated and discussed according to various embodiments of the present disclosure. System 800 includes processing system hardware 801, which can be used to control and automate various media broadcast functions. System 800 also includes streaming audio server 823, which provides content and advertisements to streaming broadcast chain 825, through which a streaming broadcast of media content can be provided to a network such as Internet 827; over the air audio server 813, which provides content and advertisements to on air broadcast chain 815, through which media content can be broadcast via a broadcast tower 817; and external ad management system 811, which provides advertisements during designated portions of a split spot break to audio servers 813 and 823.

Processing system hardware 801 includes broadcast automation system 802, which in at least one embodiment can be at least partially implemented using a NexGen® audio server; internal ad management system 807, which in at least one embodiment can be implemented at least partially using a traffic and billing system such as Viero®, and can be used to provide control for various traffic and billing functions such as entering and editing orders, and scheduling spots based at least in part on the spot break split information 806 received from spot break split module 805; and communications interface 809, which allow processing system hardware 801 to communicate via various different communications networks.

Broadcast automation system 802 includes database server 803, which provides content to one or both of over-air audio server 813 and streaming audio server 823, and spot break split module 805, which determines how a spot break should be split, and may notify internal ad management system 807 and external ad management system 811. For example, spot break split module 805 can be used to determine whether a particular percentage of a spot break should be reserved for universal advertisements, and the remaining portion reserved for targeted advertisements; which portion of the spot break could be controlled by internal ad management system 807, and which portion by external ad management system 811; whether the split proportions of the spot break could be reallocated based on the length of currently scheduled advertisements; and the like.

In at least one embodiment, processing system hardware 801 and its subcomponents can be implemented as virtual servers implemented on the same hardware as another of the illustrated devices or modules. Furthermore, various distributed processing techniques can be used to spread functionality of one or more of the illustrated servers across multiple different machines.

In various embodiments, programming provided by streaming audio server 823 to streaming broadcast chain 825 is the same programming provided by over-air audio server 813 to on air broadcast chain 815. In many instances, however, particular spots, or advertisements, included in the various spot breaks provided to on air broadcast chain 815 and streaming broadcast chain 825 can vary, even though the length and timing of the spot breaks themselves are generally consistent with each other.

In some implementations, it is desirable to be able to provide universal advertisements to all media consumers for part of the spot break, but provide targeted advertisements to some of the media consumers during another part of the spot break. Thus, for example, all consumers might receive two universal advertisements at the beginning of a spot break, while during the second part of the spot break some consumers will receive additional universal advertisements, while others will receive targeted advertising in place of the universal advertisements.

The proportion of universal advertisements to targeted advertisements received by certain consumers can be determined by spot break split module 805, and that proportion can be communicated to internal ad management system 807 and external ad management system 811. In various embodiments, spot rate module 805 can provide information to internal ad management system 807 and external ad management system 811 that designates a number of portions into which any particular spot break is to be split, a length of one or more of the particular portions of the spot break, a start time of one or more spot break portions, and end time of one or more spot break portions, or some combination of these. Various embodiments provide for different spot breaks to be split differently, providing for dynamically varying how different spot breaks are split, including dynamically varying the relative lengths of the first and second portions for different spot breaks.

In some embodiments, information specifying a spot break length may not actually be provided to the ad management systems 807 and 811. Instead, a start signal can be delivered to whichever ad management system is placed in control of a beginning portion of the spot break, and a message passing control from the initial ad management system can be delivered to the subsequent ad management system at or near the end of the beginning portion of the split spot break. In some embodiments, the message passing control from the initial ad management system to a subsequent ad management system can come in the form of a marker in the data stream being delivered to a content distribution network, such as streaming broadcast chain 825. In at least one embodiment, this marker is received and interpreted by streaming broadcast chain 825. The marker can indicate a length of time an ad insertion module, for example external ad management system 811, should be allowed to control advertisement insertions into the broadcast stream.

In other embodiments, control can be passed in other ways. For example, (1) an ad management systems can be synched to a common time clock for ad breaks, and particular ad management systems automatically assume control as specified by the common time clock; (2) ad management systems can respond to one or both of begin-control and end-control markers included in content, or in discrete messages from a centralized ad controller; (3) an ad management system can insert ads into a portion of a spot break based on a combination of synching to a time clock and content markers; (4) a content detection/recognition system can detect periods of no content, or silence, signaling ad break and initiate a change in control of ad-insertion from one management system to another; (5) an ad management system can recognize a song or other specific content item being played out, use that knowledge to determine when play-out of the media item will be completed, and synch to a clock so that specifies an ad break at upon completion of play-out of the media item.

During a time when an ad management system controls its designated portion of the spot break, the controlling ad management system can insert advertisements according to various business rules. These business rules can specify types of advertisements allowed to be played adjacent to each other, target information indicating how the advertisement should be targeted, and priority information indicating whether a particular advertisement, advertiser, group of advertisements, type of advertisement, or the like are to be given priority over other categories of advertisements. Examples of business rules that can be used to assist in assigning control of portions of an ad break to various management systems, or used in assigning particular advertisement can be found in the following patents, each of which is incorporated by reference herein in its entirety: U.S. Pat. No. 7,386,492, entitled, "Inventory And Revenue Maximization Method And System"; U.S. Pat. No. 7,941,350, entitled, "Inventory And Revenue Maximization Method And System"; U.S. Pat. No. 8,230,460, entitled, "Real-Time Insertion And Reporting Of Media Content"; U.S. Pat. No. 8,356,037, entitled, "Processes To Learn Enterprise Data Matching"; and U.S. Pat. No. 8,443,046, entitled, "Automated Content Delivery To Distributed Media Outlets."

In various embodiments, an ad management system can pass information to one or more other ad management systems to assist in implementation of various business rules. For example, a first ad management system scheduled to control insertion of advertisements into an earlier portion of a spot break can send an Ad Conflict message to a second advertisement system, which is scheduled to control insertion of advertisements into a later portion of the same spot break. The Ad Conflict message can include information about advertisements being inserted, or scheduled to be inserted by, the first ad management system. This information can include conflict information, content identifiers, rule identifiers, or similar information that can be used by the second ad management system to identify and attempt to minimize or avoid potential advertiser adjacency conflicts. For example, the first ad management system can notify the second ad management system that an ad for Cell Phone Provider A is being inserted, and include a rule reference identifier that specifies no advertisements from Cell Phone Provider B are to be played within the same spot break as an ad for Cell Phone Provider A. The second ad management system can look up the rule reference identifier, and take actions as needed to prevent insertion of a prohibited ad into a later portion of the ad break. As needed, the second ad management system can schedule an alternate ad or fill to replace a prohibited ad, pass control to another ad management system, or pass control back to the first ad management system.

In some implementations, the second ad management system can pass an Ad Conflict message to the first ad management system, allowing the first ad management system to take corrective action if needed. In various embodiments, multiple ad management systems can coordinate among themselves in an iterative manner to ensure that various business rules are complied with. Furthermore, some or all of the same information included in an Ad Conflict message of some implementations can be sent alternatively or additionally in a Change of Control message, or as part of another message delivered directly or indirectly to or from an ad management system.

In some embodiments, the message indicating the change of control between the two ad management systems can be transmitted from the initial ad management system to the subsequent ad management system, while in other embodiments, spot break split module 805 can transmit the message. In various implementations, splitting the spot break and insertion of advertisements into split spot breaks can be performed in advance, rather than in near real-time. For example, during generation of a radio station's clock or log, spot breaks foot module 805 can instruct internal ad management system 807 to schedule advertisements and fill in only the first 75 seconds in a 130 second spot break, and instruct external ad management system 811 to provide advertisements and fill for the remaining 55 seconds of the spot break.

Figure 9:
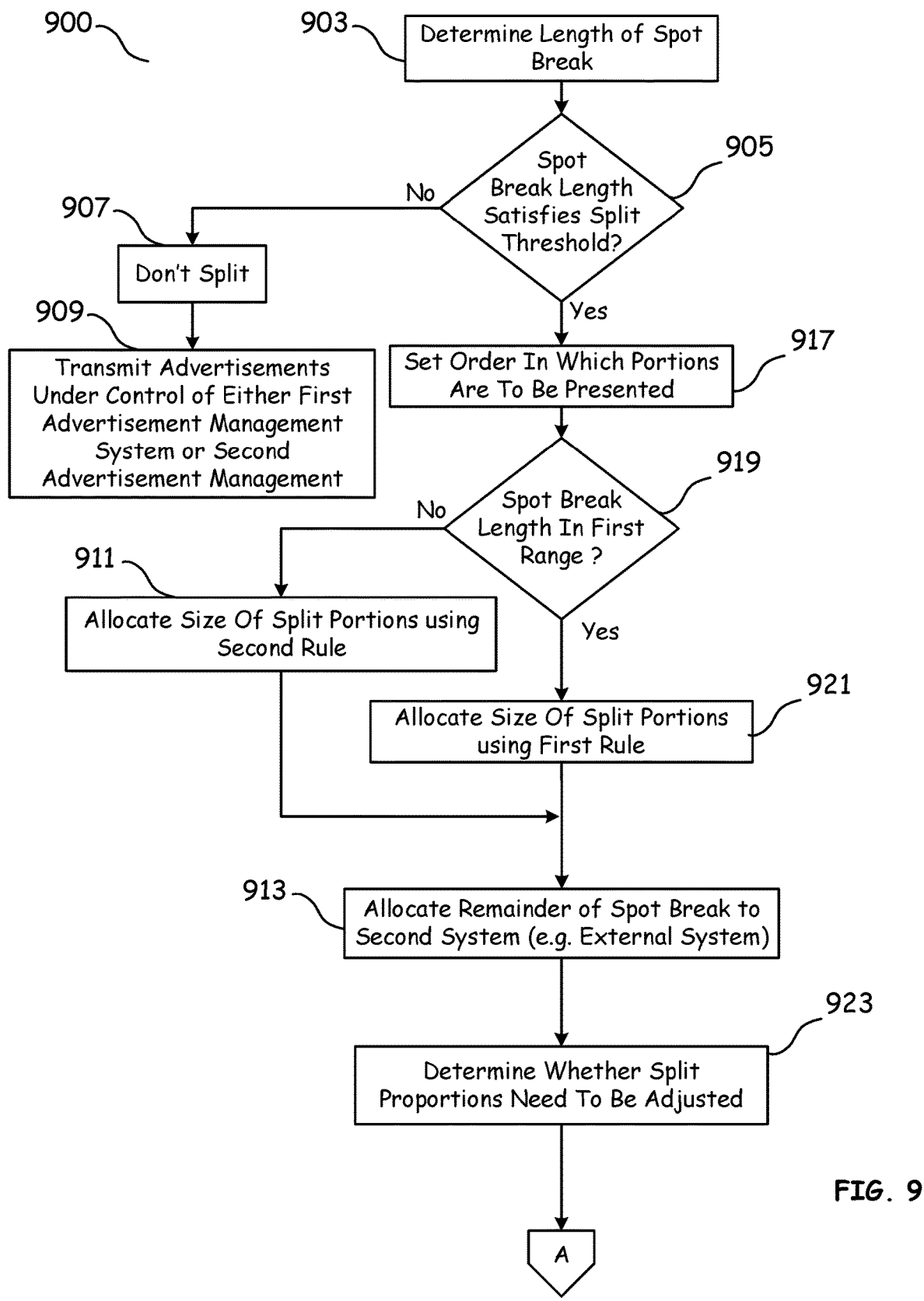
FIG. 9 is a flowchart illustrating method of splitting spot breaks according to various embodiments of the present disclosure.

Referring next FIG. 9, a method 900 according to various embodiments of the present disclosure will be discussed. At block 903 length of the spot break is determined. The length of the spot break can be determined from a program clock were station log. A check is made to determine whether the length of the spot break satisfies a split threshold, as illustrated by block 905. In various embodiments, it is desirable to leave very short spot breaks intact, without being split, because splitting very short spot breaks could prevent some longer advertisements from running, and results in shorter spot breaks having fewer advertisements and more fill. In at least one embodiment, the split threshold specifies that spot breaks having a length of 74 seconds or less are not to be split. Note that the split threshold can be configured differently for each individual station, so that although a 76 second spot break will be split into two portions for a first station, that same 76 second spot break will not be split for a second station.

As noted earlier, splitting a spot break can refer to dividing control between an internal ad management system and an external ad management system, and/or splitting a spot break between universal and targeted advertisements. Likewise, the split threshold can refer to a division of control between different ad management systems, and/or dividing a spot break between universal and targeted advertisements. Furthermore the rule can be specified for implementation at either or both an internal ad management system or an external ad management system.

As illustrated by block 907, if the spot break is determined to be too short to split, the spot break is not split. As illustrated by block 909, if the spot break is not split, advertisements can be transmitted under control of a single advertisement management system, either the first advertisement management system for a second advertiser management system. In cases where a single advertisement management system manages the entire spot break, but provides some targeted advertisements in some universal advertisements, one type or the other of advertisement can be provided—for example, either all universal or all targeted. Note that use of the terms "first" and "second" is not intended to refer to an order, or sequence, but rather these terms are used simply to differentiate one advertisement management system from another.

If it is determined at block 905 that the length of the spot break sufficient to satisfy the split threshold, an order in which the different portions of the spot break are to be presented is determined that block 917. Note that in various embodiments, the universal advertisements are always presented during a portion of a spot block that is first in time, and the targeted advertisements are assigned to any remaining portion of the spot block that is unused by the universal advertisements. Similarly, in some such embodiments ad management systems responsible for delivering primarily universal advertisements are always assigned a beginning portion of a spot break, and ad management system responsible for delivering primarily targeted advertisements are allotted the remaining, or terminal, portion of the spot break on use by the ad management system delivering the universal advertisements.

At block 919 a determination is made regarding whether the spot break total length falls within a first range. If the length of the spot break falls within a first range of links, the internal and external ad management systems are allocated portions of the spot break based on a first rule as illustrated by block 921. If the length of the spot break does not fall within the first range, as illustrated by block 919, the split portions can be allocated using a second rule, as illustrated by block 911. In either case, the remainder of the spot break is allocated to the other of the two ad management systems, as illustrated by block 913.

In some embodiments, the portion of the spot break allocated to the different ad management servers at block 921 can be determined using a tiered model, based on the total length of the spot break. For example, a spot break that meets a first threshold requirement, which may or may not be the same as the split threshold requirement, can result in an internal ad management system being allocated a certain portion of the spot break, while a longer spot break that meets a second threshold would result in the internal ad management system being allocated a greater portion of the spot break, although the increased portion allocated to the internal ad management system is not necessarily coextensive with the increase in the total size of the spot break.

In at least one embodiment, for every 1 min. of length in a spot break, an internal ad management system can be assigned control of Y seconds of the spot break. For example, if a spot break is zero (0) to 74 seconds long, it may not be considered long enough to split. If a spot break is 74 seconds to 134 seconds long, the internal ad management system may be assigned to 60 seconds minimum allocation. For a spot break that is between 135 seconds and 185 seconds long, the internal ad management system may be assigned 120 seconds minimum allocation.

Other spot break lengths and proportions can be used consistent with the teachings set forth herein. For example, Y (the length assigned per minute of spot break length) may be a fixed value, such as 60 seconds, or the value of Y can be varied to provide different length allocations for different tiers of a spot break. In some embodiments, an internal ad management system may be assigned 60 seconds of a spot break having only between 74 seconds and 134 seconds, but be assigned only 90 seconds for spot break between 135 and 185 seconds. A spot break can be assigned to different tiers based on length, and/or based on various business or technical considerations, such as estimated revenue of targeted ads versus universal ads, the cost of delivering targeted ads, whether targeted ads or universal ads will satisfy advertisement campaign requirements, or the like.

In some embodiments, a determination regarding whether or not to adjust the allocated splits is made, as illustrated by block 923. In some embodiments, the decision to adjust the split can be pre-determined on an individual, station-by-station basis. Thus, changing the split might be prohibited by some stations, and allowed by others. Subject to split adjustment being enabled, the decision about whether to adjust the split can depend on how many paid or unpaid advertisements the internal and external ad management systems are prepared to provide, the revenue expected from advertisements provided by the respective systems, how much fill is available, or the like.

In some embodiments determining whether split proportions need to be adjusted, as illustrated by block 923, can include determining whether one or more portions of an ad break are to be combined or recombined, to decrease the number of portions into which a spot break is split. The decision to combine can be based on whether or not particular ad management systems have sold out sufficient inventory to fill their assigned portions, whether a particular spot break will support the number of portions contemplated, whether conflicting ad content is likely to be caused by the split granularity being too fine, whether too fine a granularity would cause various other inventory constraints, or based on other business rules. Combining two spot break portions can be performed on-the-fly, and can include passing control of an assigned portion of a spot break either early or late, or passing control to a standby system.

Figure 10:
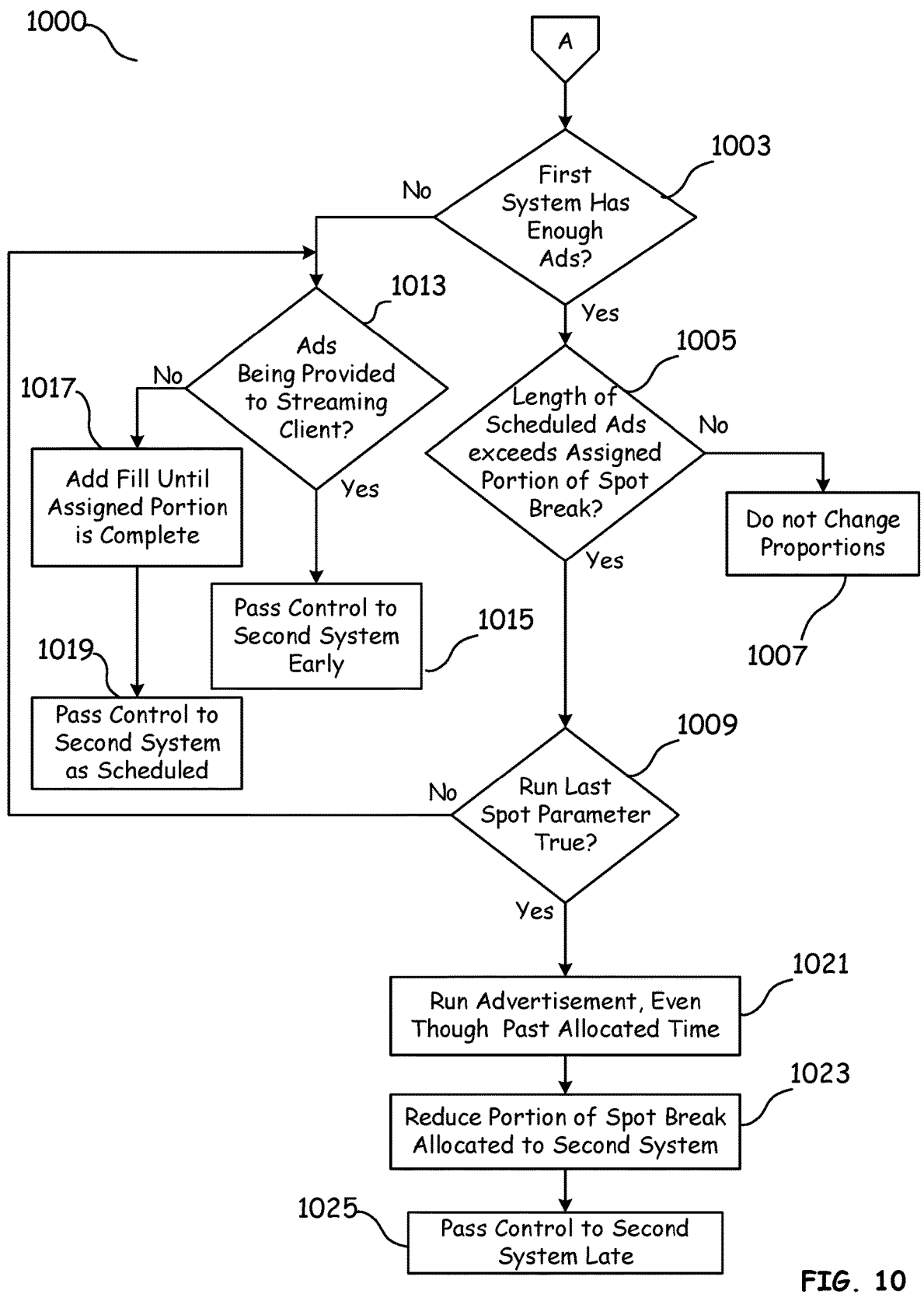
FIG. 10 is a flowchart illustrating methods of adjusting split spot break lengths according to various embodiments of the present disclosure.

Referring next to FIG. 10, the decision about whether or not to adjust the split of a particular spot break split is discussed in greater detail with reference to method 1000. In general, the local ad management system may have too few, just enough, or too many advertisements scheduled for its allocated portion of a spot break. If there are just enough, then the split does not need to be adjusted. If there are too few advertisements, then the first ad management system can either add filler or pass control to the next ad management system early. If too many advertisements are scheduled, there are two different options: 1) run the advertisements as scheduled and pass control late to the next system; or 2) forgo running the excess advertisements and pass control early. Additional filler can, in some cases, be inserted to keep the length of the portion as close to originally planned as practical.

As illustrated by block 1003, a check is performed to determine whether the initial ad management system has enough ads to fill its assigned portion of the split spot block. If the initial ad management system does not have enough advertisements, a check is made to determine whether the advertisements being provided by the first system are being provided to a streaming client, as illustrated by block 1013. If the advertisements are being provided to a streaming client, the first ad management system passes control to the second ad management system early, as illustrated by block 1015. As illustrated by block 1017, if the advertisements are not being provided to a streaming client, the first ad management system, will add fill until its assigned portion of the spot break is complete. As illustrated by block 1019, control is passed to the second ad management system per the originally determined split.

If the first ad management system has enough ads to fill its assigned portion of the spot break, a determination is made at block 1005 to determine whether the length of the scheduled ads being provided by the first ad management system exceed the link of the first ad management system's assigned portion of the spot break. If the length of the scheduled ads does not exceed the assigned portion of the spot break then, as illustrated by block 1007, the split proportions are not changed.

If, however, the length of the scheduled ads does exceed the first ad management system's assigned portion of the spot break a determination is made regarding whether the current ad management system will surrender a terminal portion of its allotted portion of the spot break based, at least in part, on a length of a final advertisement scheduled to be inserted into the first portion of the spot break. Thus, if running the last scheduled advertisement will result in exceeding the assigned portion of the spot break split, another check is made at block 1009 to determine whether or not the run last spot parameter is set to true. If the run last spot parameter is false, the last ad scheduled to be run will not be run, and a decision must be made whether or not to pass control to the next ad management system early, or whether to fill the remaining time freed by deciding not to run the last ad with filler. Thus, if the run last spot parameter is false, the method proceeds from block 1009 back to block 1013.

If however the run last spot parameter is true, as illustrated by block 1021, the last advertisement will be run, even though running the last advertisement will use up more than the first ad management system's allocated portion of the spot break. Because the first ad management system is using up more than its allotted time, as illustrated by block 1023 the portion of the spot break allocated to the second ad management system will be correspondingly reduced, and control will be passed to the second ad management system later than originally determined.

Referring next to FIG. 11, various options for splitting a single spot break will be discussed according to embodiments of the present disclosure. As illustrated by FIG. 11, various different orders of control can be applied to a split spot break, for example, internal first, then external (row 1); external first then internal (row 2); alternating internal and external control for each spot break (row 3); alternating between allowing complete internal control of one break and complete external control of the next break (row 4); a three way split with internal, sellable ads first, external sellable ads second, and fill provided by the internal ad management system (row 5); and a three way split with external, sellable ads first, internal sellable ads second, and fill provided by the external ad management system (row 6).

Each row of the table shown in FIG. 11 illustrates a different split order, with the columns representing various consequences of selecting a particular split order. For example, row one shows a split order in which an internal ad management system is given control of the initial portion of the spot break, and external, or third-party, ad management system is given control of the second portion of the spot break. The listening experience perceived by a media consumer refers to the order in which the consumer may be provided with content. For example, in row one, a listener will hear advertisements provided by the internal ad management system, followed by fill provided by the internal ad management system, followed by advertisements provided by the third-party ad management system, followed by fill provided by the third-party ad management system. In some embodiments this would result in universal/national ad, universal/national fill, targeted/local ads, and finally targeted/local fill.

The category conflict column indicates whether or not there is a potential for conflict between advertisement categories. A category conflict can occur, for example, when a universal/national advertisement for one type of product has the potential to be followed by a targeted advertisement for a competing product of the same type. Typically, category conflicts are handled by the ad management server controlling advertisement insertion into the spot break. But in some embodiments, ad insertion for different portions of a single ad break is controlled by different ad management servers, and category conflicts have the potential to arise between the ad management servers. Because a single ad management server does not control the entire spot break, a technique for handling conflicts between different ad management servers can be used to improve the listening/viewing experience for media consumers. In some embodiments, information passed directly or indirectly between the different ad management servers can be used to avoid, or minimize, the occurrence and impact of inter-server conflicts that may arise. It will be noted that row 4 does not present a potential for inter-server conflicts, because a single ad management server controls an entire spot break.

The Constraints on Inventory/Pacing Management column refers generally to limitations on presenting advertisements imposed by various split arrangements. Pacing refers generally to the speed/frequency with which an inventory of sold advertisements is carried out. For example, if 200 spots are sold for playout on weekdays during a particular month, to remain "on pace" to playout all of the advertisements during the month, 10 spots should be aired each weekday of the month (assuming a 4 week month). Some split orders can make it more difficult to remain on pace during periods of increased ad play, for example a national ad campaign that requires a large number of advertisements to be played during a limited period of time, because the available ad time is split between national and local ads. This effectively leaves less time for playout of the national ads. Consider row 4, for example. Assume that a broadcast hour includes two ad breaks, and it is desirable to broadcast a particular ad 2 times per hour to stay on pace. Further assume that business rules prohibit 2 ads from being played during the same hour. It is apparent that the desired pace cannot be maintained, because only one ad can be played each hour.

The Revenue Management, Ad Ops POV (Point of View) column illustrates how a particular type of ad break split will affect revenue management and ad opportunities. For example, if an ad break is split as illustrated by row 1, it may be more difficult to sell ad space to national buyers, since national ads will generally air at the end of an ad break. If the split is performed according to row 2, local ads may be more difficult to sell. If control of an ad break is performed as shown in row 3, local and national ads are alternated, so there will be little negative impact.

The last column, labeled NPP POV (national programming platform point of view) shows how the split arrangement can be viewed from the perspective of the NPP. Generally, although not necessarily always, both the first and second ad management servers insert fill from NPP. This fill can be short form fill, which is sometimes considered less desirable, and long form fill, which is generally considered to be more desirable. If a split type results in ad breaks that have very little room for fill, the NPP may have to provide the less desirable short form fill. However, the split arrangement shown by row 5 is likely to provide the opportunity to use more long form fill, which NPP will generally find to be desirable.

Referring next to FIG. 12, a diagram illustrating the timing of the spot break split according to the split order shown in row six of FIG. 11 will be discussed. FIG. 12 includes a NexGen® being used to implement a broadcast automation system that facilitates providing spot break splits. In particular, NexGen® digital server 1203 splits control of spot break 1205 into two portions, a first portion controlled by an internal ad management server, allows the internal ad management server to insert advertisements and/or fill into the spot break up to the split. After the split, an external ad management server is scheduled to control insertion of advertisements and fill into the spot break. As illustrated the internal ad management server can pass control of the spot break to the external ad management server early, i.e. prior to the scheduled split.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprising:
   at a first advertisement management system, assuming control of inserting advertisements into a spot break for a first pre-allocated portion of the spot break, the first pre-allocated portion of the spot break having a duration and a scheduled conclusion;

at the first advertisement management system, making a first determination, based at least in part on a number of advertisements available for insertion into the first pre-allocated portion of the spot break by the first advertisement management system, whether control of inserting advertisements into the spot break is to be passed to a second advertisement management system at the scheduled conclusion of the first pre-allocated portion of the spot break, prior to the scheduled conclusion of the first pre-allocated portion of the spot break, or later than the scheduled conclusion of the first pre-allocated portion of the spot break;

wherein making the first determination further includes:
determining whether a length of scheduled advertisements exceeds the duration of the first pre-allocated portion of the spot break;
determining whether a Run Last Spot parameter indicates that the first advertisement management system is permitted to retain control of inserting advertisements into the spot break beyond the duration of the first pre-allocated portion of the spot break; and
passing control from the first advertisement management system to the second advertisement management system in accordance with the first determination.

2. The method of claim 1, wherein making the first determination further includes:
determining whether the first advertisement management system is providing advertisements for insertion by a streaming client.

3. The method of claim 2, further comprising:
passing control from the first advertisement management system to the second advertisement management system prior to the scheduled conclusion of the first pre-allocated portion of the spot break in response to determining that:
the number of advertisements available for insertion into the first pre-allocated portion of the spot break is insufficient to fill the first pre-allocated portion of the spot break, and
the first advertisement management system is providing advertisements for insertion by a streaming client.

4. The method of claim 2, further comprising:
in response to determining that the number of advertisements available for insertion into the first pre-allocated portion of the spot break is insufficient to fill the first pre-allocated portion of the spot break, and that the first advertisement management system is not providing advertisements for insertion by a streaming client:
adding sufficient fill items to complete the first pre-allocated portion of the spot break; and
passing control from the first advertisement management system to the second advertisement management system at the scheduled conclusion of the first pre-allocated portion of the spot break.

5. The method of claim 1, further comprising:
passing control from the first advertisement management system to the second advertisement management system later than the scheduled conclusion of the first pre-allocated portion of the spot break in response to determining that:
a length of scheduled advertisements exceeds the duration of the first pre-allocated portion of the spot break; and
the Run Last Spot parameter indicates that the first advertisement management system is permitted to retain control of inserting advertisements into the spot break beyond the duration of the first pre-allocated portion of the spot break.

6. A device comprising:
at least one processor and memory implementing a first advertisement management system, the first advertisement management system configured to:
assume control of inserting advertisements into a spot break for a first pre-allocated portion of the spot break, the first pre-allocated portion of the spot break having a duration and a scheduled conclusion;
make a first determination, based at least in part on a number of advertisements available for insertion into the first pre-allocated portion of the spot break by the first advertisement management system, whether control of inserting advertisements into the spot break is to be passed to a second advertisement management system at the scheduled conclusion of the first pre-allocated portion of the spot break, prior to the scheduled conclusion of the first pre-allocated portion of the spot break, or later than the scheduled conclusion of the first pre-allocated portion of the spot break;
wherein the first advertisement management system is further configured to:
determine whether a length of scheduled advertisements exceeds the duration of the first pre-allocated portion of the spot break;
determine whether a Run Last Spot parameter indicates that the first advertisement management system is permitted to retain control of inserting advertisements into the spot break beyond the duration of the first pre-allocated portion of the spot break; and
pass control from the first advertisement management system to the second advertisement management system in accordance with the first determination.

7. The device of claim 6, wherein the first advertisement management system is further configured to:
determine whether the first advertisement management system is providing advertisements for insertion by a streaming client.

8. The device of claim 7, wherein the first advertisement management system is further configured to:
pass control from the first advertisement management system to the second advertisement management system prior to the scheduled conclusion of the first pre-allocated portion of the spot break in response to determining that:
the number of advertisements available for insertion into the first pre-allocated portion of the spot break is insufficient to fill the first pre-allocated portion of the spot break, and
the first advertisement management system is providing advertisements for insertion by a streaming client.

9. The device of claim 7, wherein the first advertisement management system is further configured to:
in response to determining that the number of advertisements available for insertion into the first pre-allocated portion of the spot break is insufficient to fill the first pre-allocated portion of the spot break, and that the first advertisement management system is not providing advertisements for insertion by a streaming client:
add sufficient fill items to complete the first pre-allocated portion of the spot break; and
pass control from the first advertisement management system to the second advertisement management system at the scheduled conclusion of the first pre-allocated portion of the spot break.

10. The device of claim 6, wherein the first advertisement management system is further configured to:
pass control from the first advertisement management system to the second advertisement management system later than the scheduled conclusion of the first pre-allocated portion of the spot break in response to determining that:
a length of scheduled advertisements exceeds the duration of the first pre-allocated portion of the spot break; and
the Run Last Spot parameter indicates that the first advertisement management system is permitted to retain control of inserting advertisements into the spot break beyond the duration of the first pre-allocated portion of the spot break.

11. A non-transitory computer readable medium tangibly embodying a program of instructions configured to be stored in a memory and executed by a processor implementing a first advertisement management system, the program of instructions including
at least one instruction to assume control of inserting advertisements into a spot break for a first pre-allocated portion of the spot break, the first pre-allocated portion of the spot break having a duration and a scheduled conclusion;
at least one instruction to make a first determination, based at least in part on a number of advertisements available for insertion into the first pre-allocated portion of the spot break by the first advertisement management system, whether control of inserting advertisements into the spot break is to be passed to a second advertisement management system at the scheduled conclusion of the first pre-allocated portion of the spot break, prior to the scheduled conclusion of the first pre-allocated portion of the spot break, or later than the scheduled conclusion of the first pre-allocated portion of the spot break;
wherein the at least one instruction to make a first determination further includes:
at least one instruction to determine whether a length of scheduled advertisements exceeds the duration of the first pre-allocated portion of the spot break; and
at least one instruction to determine whether a Run Last Spot parameter indicates that the first advertisement management system is permitted to retain control of inserting advertisements into the spot break beyond the duration of the first pre-allocated portion of the spot break; and
at least one instruction to pass control from the first advertisement management system to the second advertisement management system in accordance with the first determination.

12. The non-transitory computer readable medium of claim 11, wherein the program of instructions further includes:
at least one instruction to determine whether the first advertisement management system is providing advertisements for insertion by a streaming client.

13. The non-transitory computer readable medium of claim 12, wherein the program of instructions further includes:
at least one instruction to pass control from the first advertisement management system to the second advertisement management system prior to the scheduled conclusion of the first pre-allocated portion of the spot break in response to determining that:
the number of advertisements available for insertion into the first pre-allocated portion of the spot break is insufficient to fill the first pre-allocated portion of the spot break, and
the first advertisement management system is providing advertisements for insertion by a streaming client.

14. The non-transitory computer readable medium of claim 12, wherein the program of instructions further includes:
at least one instruction to add sufficient fill items to complete the first pre-allocated portion of the spot break in response to determining that the number of advertisements available for insertion into the first pre-allocated portion of the spot break is insufficient to fill the first pre-allocated portion of the spot break, and that the first advertisement management system is not providing advertisements for insertion by a streaming client by; and
at least one instruction to pass control from the first advertisement management system to the second advertisement management system at the scheduled conclusion of the first pre-allocated portion of the spot break.

15. The non-transitory computer readable medium of claim 11, wherein the program of instructions further includes:
at least one instruction to pass control from the first advertisement management system to the second advertisement management system later than the scheduled conclusion of the first pre-allocated portion of the spot break in response to determining that:
a length of scheduled advertisements exceeds the duration of the first pre-allocated portion of the spot break; and
the Run Last Spot parameter indicates that the first advertisement management system is permitted to retain control of inserting advertisements into the spot break beyond the duration of the first pre-allocated portion of the spot break.

* * * * *